United States Patent
Kilian

(10) Patent No.: US 7,216,257 B2
(45) Date of Patent: May 8, 2007

(54) REMOTE DEBUGGING

(75) Inventor: Frank Kilian, Mannheim (DE)

(73) Assignee: SAP AG, Walldorf (DE)

( * ) Notice: Subject to any disclaimer, the term of this patent is extended or adjusted under 35 U.S.C. 154(b) by 457 days.

(21) Appl. No.: 10/762,921

(22) Filed: Jan. 21, 2004

(65) Prior Publication Data

US 2005/0172168 A1 Aug. 4, 2005

(51) Int. Cl.
*G06F 11/00* (2006.01)

(52) U.S. Cl. .......................... 714/31; 714/43

(58) Field of Classification Search ............ None
See application file for complete search history.

(56) References Cited

U.S. PATENT DOCUMENTS

| | | | |
|---|---|---|---|
| 6,216,237 B1 * | 4/2001 | Klemm et al. ............ 714/38 |
| 6,263,456 B1 * | 7/2001 | Boxall et al. ............. 714/31 |
| 6,604,209 B1 * | 8/2003 | Grucci et al. ............ 714/38 |
| 6,647,301 B1 * | 11/2003 | Sederlund et al. ......... 700/79 |
| 6,654,914 B1 * | 11/2003 | Kaffine et al. ............ 714/43 |
| 6,904,544 B2 * | 6/2005 | DeRolf et al. ............ 714/43 |
| 7,051,316 B2 * | 5/2006 | Charisius et al. .......... 717/103 |
| 2002/0069378 A1 * | 6/2002 | McLellan et al. .......... 714/43 |
| 2002/0091969 A1 * | 7/2002 | Chen et al. .............. 714/43 |
| 2003/0051195 A1 * | 3/2003 | Bosa et al. .............. 714/43 |
| 2005/0144507 A1 * | 6/2005 | Lee et al. ............... 714/4 |

\* cited by examiner

*Primary Examiner*—Scott Baderman
*Assistant Examiner*—Joshua Lohn
(74) *Attorney, Agent, or Firm*—Blakely Sokoloff Taylor & Zafman

(57) ABSTRACT

A system and method are described for remotely debugging an application server. In one embodiment, a plurality of application servers are organized into groups referred to as "instances." Each instance may include a group of redundant application servers, one or more debug nodes, and a dispatcher. The dispatcher distributes service requests to each of the application servers in accordance with a load-balancing mechanism. In addition, a central message passing architecture is defined which allows the various instances to communicate with one another. In one embodiment, a debug node is isolated from the load-balancing mechanism. The debug node may also be isolated from the central message passing architecture. A remote node may then debug an application on the debug node, without disrupting processes executing on other application servers in the instance.

15 Claims, 7 Drawing Sheets

REMOTE DEBUGGING

TECHNICAL FIELD

Embodiments of the invention generally relate to the field of data processing systems and, more particularly, to a system and method for remotely debugging data processing systems.

BACKGROUND

Traditional client-server systems employ a two-tiered architecture such as that illustrated in FIG. 1. Applications 102 executed on the client side 100 of the two-tiered architecture are comprised of a monolithic set of program code including a graphical user interface component, presentation logic, business logic and a network interface that enables client 100 to communicate over network 103 with one or more servers 101. A database 104 maintained on server 101 provides non-volatile storage for the data accessed and/or processed by application 102.

As is known in the art, the "business logic" component of the application represents the core of the application, for example, the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1 become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 2. In the multi-tiered system, presentation logic 221, business logic 222 and database 223 are logically separated from the user interface 220. These layers are moved off of client 225 to one or more dedicated servers on network 203. For example, presentation logic 221, business logic 222, and database 223 may each be maintained on separate servers, 226, 227 and 228, respectively.

This separation of logic components and the user interface provides a more flexible and scalable architecture compared to that provided by the two-tier model. For example, the separation ensures that all clients 225 share a single implementation of business logic 222. If business rules change, changing the current implementation of business logic 222 to a new version may not require updating any client-side program code. In addition, presentation logic 221 may be provided which generates code for a variety of different user interfaces 220, which may be standard browsers such as Internet Explorer® or Netscape Navigator®.

The multi-tiered architecture illustrated in FIG. 2 may be implemented using a variety of different application technologies at each of the layers of the multi-tier architecture, including those based on the Java 2 Enterprise Edition™ ("J2EE") standard, the Microsoft.NET standard and/or the Advanced Business Application Programming ("ABAP") standard developed by SAP AG. For example, in a J2EE environment, business layer 230, which handles the core business logic of the application, is comprised of Enterprise Java Bean ("EJB") components with support for EJB containers. Within a J2EE environment, presentation layer 232 is responsible for generating servlets and Java Server Pages ("JSP") interpretable by different types of browsers at user interface layer 234.

Although the multi-tiered system illustrated in FIG. 2 provides a more flexible and scalable architecture, it also results in significant additional complexity. For example, debugging an application in business layer 230 may impact the operation of the entire layer. Accordingly, new techniques which simplify the debugging of multi-tiered enterprise systems are desirable.

SUMMARY OF THE INVENTION

A system and method are described for remotely debugging an application server. In one embodiment, a plurality application servers are organized into groups referred to as "instances." Each instance may include a group of redundant application servers, one or more debug nodes, and a dispatcher. The dispatcher distributes service requests to each of the application servers in accordance with a load-balancing mechanism. In addition, a central message passing architecture is defined which allows the various instances to communicate with one another. In one embodiment, a debug node is isolated from the load-balancing mechanism. The debug node may also be isolated from the central message passing architecture. A remote node may then debug an application on the debug node, without disrupting processes executing on other application servers in the instance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for remotely debugging a data processing system. In an embodiment, an instance of application servers includes a debug node. In an embodiment, the debug node is isolated from a load-balancing mechanism used to distribute service requests. The debug node may also be isolated from the central message passing architecture. As is further described below, a remote node may then debug an application on the debug node, without disrupting processes executing on other application servers in the instance.

Figure 1:
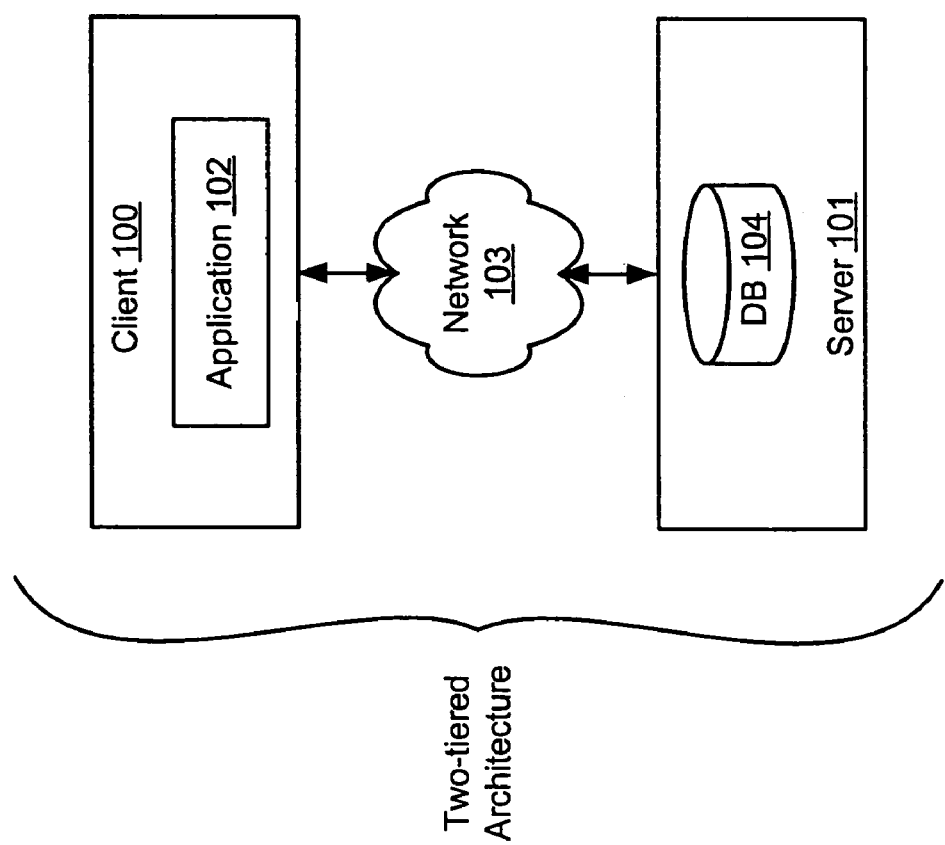
FIG. 1 illustrates a traditional two-tier client-server architecture.
Figure 2:
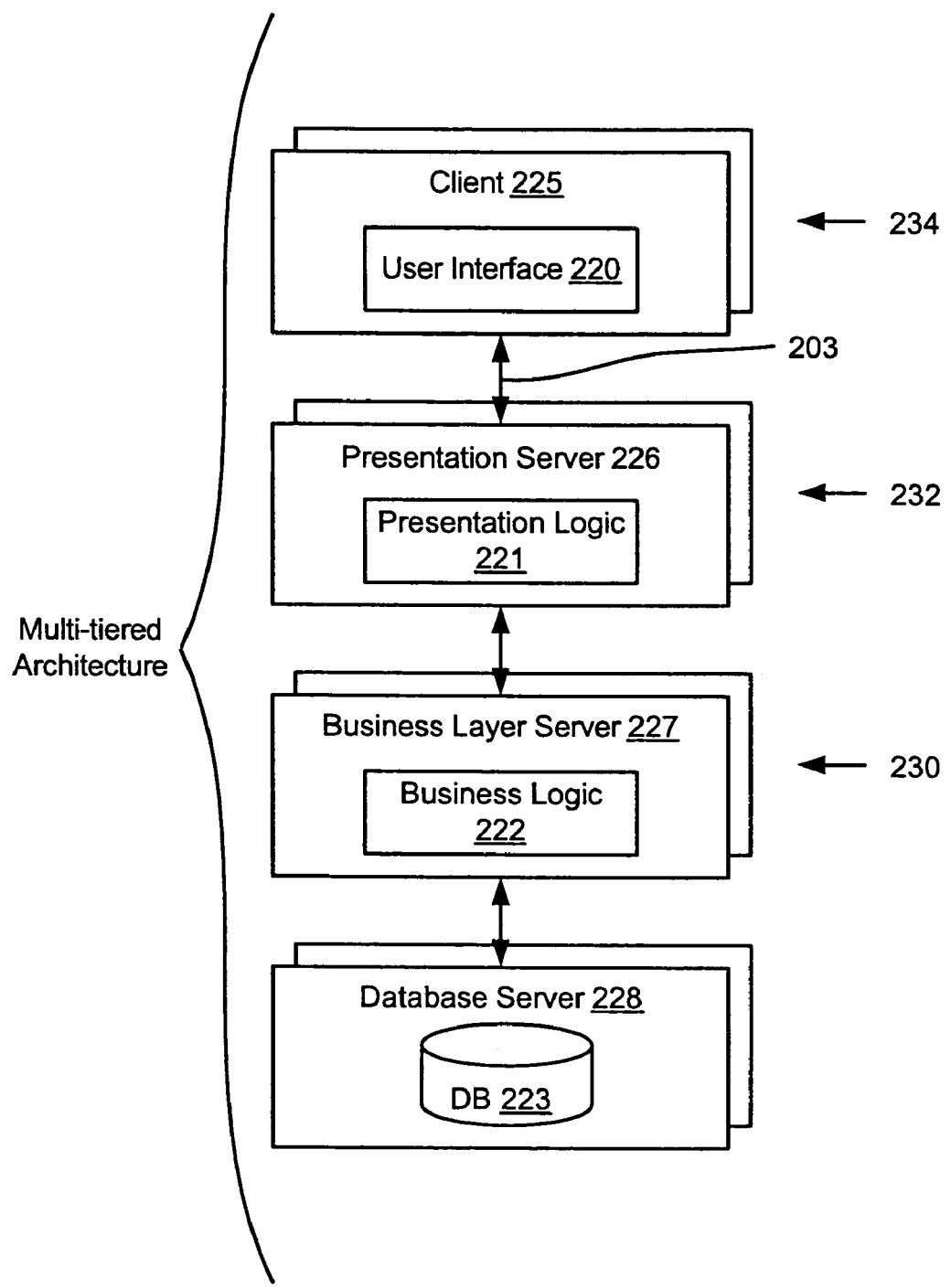
FIG. 2 illustrates a prior art multi-tier client-server architecture.
Figure 3:
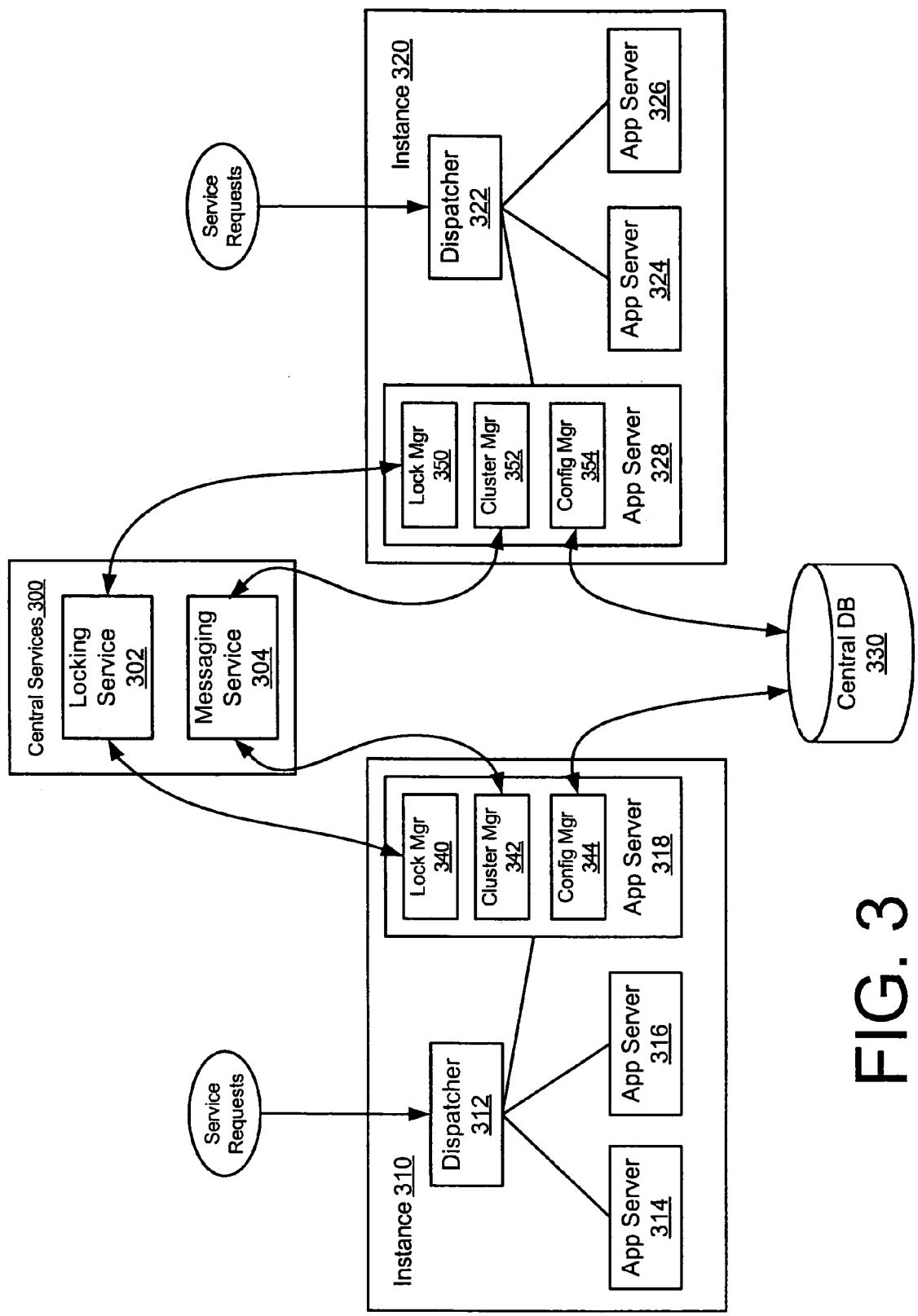
FIG. 3 illustrates an application server system architecture according to one embodiment of the invention.

A system architecture according to one embodiment of the invention is illustrated in FIG. 3. The architecture includes a central services instance 300 and a plurality of application server instances 310, 320. As used herein, the application server instances, 310 and 320, each include a group of application servers 314, 316, 318 and 324, 326, 328, respectively, and a dispatcher, 312, 322, respectively. The central services instance 300 includes a locking service 302 and a messaging service 304 (described below). The combination of all of the application instances 310, 320 and the central services instance 300 is referred to herein as a "cluster." Although the following description will focus solely on instance 310 for the purpose of explanation, the same principles apply to other instances such as instance 320.

The application servers 314, 316, 318 within instance 310 provide the business and/or presentation logic for the network applications supported by the system. Each of the application servers 314, 316, 318 within a particular instance 310 may be configured with a redundant set of application logic and associated data. In one embodiment, the dispatcher 310 distributes service requests from clients to one or more of the application servers 314, 316, 318 based on the load on each of the servers. For example, in one embodiment, the dispatcher 312 implements a round-robin policy of distributing service requests. The term "load-balancing mechanism" refers to the logic implemented by dispatcher 312 to distribute service requests to the application servers 314, 316, 318.

The application servers 314, 316, 318 may be Java 2 Enterprise Edition ("J2EE") application servers which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate with one another via a message passing protocol. For example, messages from one server may be broadcast to all other servers within the cluster via the messaging service 304. Alternatively, messages may be addressed directly to specific servers within the cluster (e.g., rather than being broadcasted to all servers).

In one embodiment, locking service 302 disables access to (e.g., locks) certain specified portions of configuration data and/or program code stored within a central database 330. The locking manager locks data on behalf of various system components which need to synchronize access to specific types of data and program code (e.g., such as the configuration managers 344, 354 illustrated in FIG. 3). In the illustrated embodiment, the locking service enables a distributed caching architecture for caching copies of server/dispatcher configuration data.

In one embodiment, messaging service 304 and locking service 302 are each implemented on dedicated servers. In an alternative embodiment, however, messaging service 304 and locking service 302 may be implemented on a single server. In yet another alternative embodiment, messaging service 304 and locking service 302 may be distributed across multiple servers while still complying with the underlying principles of the invention.

As illustrated in FIG. 3, each application server (e.g., 318, 328) may include a lock manager 340, 350 for communicating with locking service 302; a cluster manager 342, 352 for communicating with messaging service 304; and a configuration manager 344, 354 for communicating with central database 330 (e.g., to store/retrieve persistent data). Although the lock manager 340, 350, cluster manager 342, 352 and configuration manager 344, 354 are illustrated only with respect to application servers 318 and 328 in FIG. 3, each of the application servers 314, 316, 324 and 326 and/or on the dispatchers 312, 322 may be equipped with equivalent lock managers, cluster managers, and configuration managers while still complying with the underlying principles of the invention.

Figure 4:
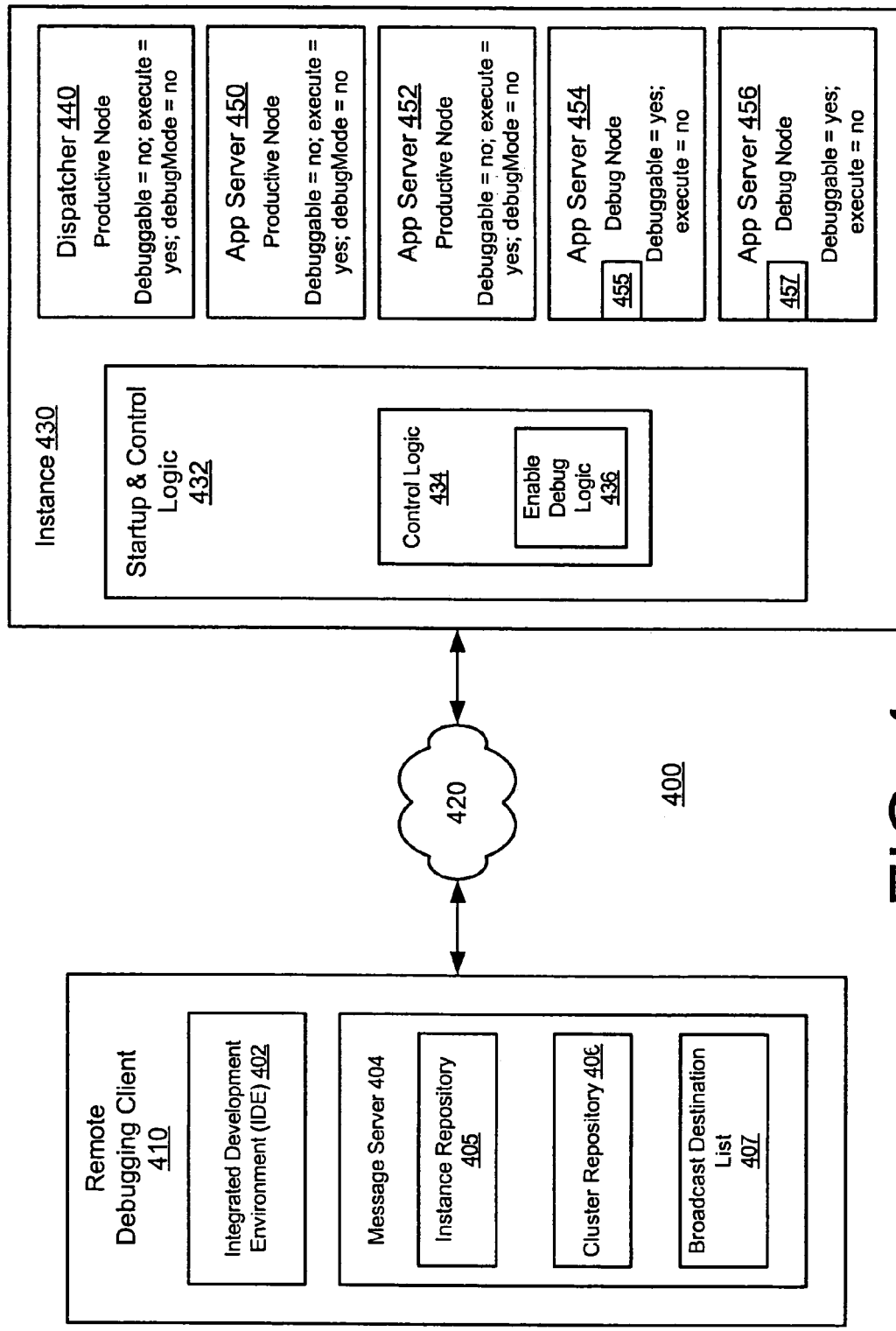
FIG. 4 illustrates selected elements of system 400 suitable for remote debugging according to an embodiment of the invention.

In an embodiment of the invention, a remote computing device may debug application logic within, for example, instance 310. FIG. 4 illustrates selected elements of system 400 suitable for remote debugging according to an embodiment of the invention. System 400 includes remote debugging client 410, instance of application servers 430, and message server 404.

In an embodiment, remote debugging client 410 includes Integrated Development Environment (IDE) 402. In one embodiment, IDE 402 and message server 404 are implemented on separate computing devices. In an alternative embodiment, IDE 402 and message server 404 are distributed across two or more computing devices. Remote debugging client 410 may also have more elements, fewer elements, and/or different elements, than those shown in FIG. 4.

IDE 402 provides a software development environment for writing and/or debugging computer software. The term "debugging" broadly refers to finding and removing errors from computer software (or, for ease of reference, simply software). In an embodiment, IDE 402 may be used to debug an application available in instance 430. In one embodiment, IDE 402 is based on (or is an implementation of), at least in part, the Eclipse Platform available under the Common Public License from the Eclipse Consortium (www.eclipse.org). In an alternative embodiment, IDE 402 may be a different development environment.

Message server 404 provides logic to interact with a messaging service of instance 430 (e.g., messaging service 302 shown in FIG. 3). The illustrated embodiment of message server 404 includes instance repository 405, cluster repository 406, and broadcast destination list 407. Instance repository 405 includes logic to exchange messages with instance 430. Cluster repository 406 may include messaging logic for a cluster of application servers. For example, in an embodiment cluster repository 406 maintains broadcast destination list 407. In an embodiment, broadcast destination list 407 is a list of application servers that are designated to receive broadcast messages.

Network 420 connects remote debugging client 410 to message server 404, and/or instance 430. Network 420 may be any kind of network. For example, network 420 may be a wired or wireless Local Area Network (LAN), Wide Area Network (WAN), Metropolitan Area Network (MAN), and/or the Internet. In an embodiment, information may be sent over network 420 in accordance with Internet protocols such as the HyperText Transfer Protocol (HTTP) and the Transmission Control Protocol (TCP). The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP Protocol). Similarly, the TCP protocol refers to any of the TCP protocols including, for example, the protocol described in RFC 793 entitled, "Transmission Control Protocol," September 1981 (hereinafter, the TCP Protocol).

Instance 430 includes startup and control logic 432, dispatcher 440, and application servers 450, 452, 454, and 456. In one embodiment, startup and control logic 432 provides the central point of control for instance 430 and for all processes executed within the application servers and dispatchers of instance 430. Startup and control logic 432 is further described below with reference to FIG. 5.

In an embodiment, dispatcher 440 and application servers 450, 452 are similar to the dispatchers and application servers described above with reference to FIG. 3. That is, dispatcher 440 may receive service requests from one or more users and implement a load-balancing mechanism to distribute the service requests among, for example, application servers 450 and 452. For ease of reference, dispatcher 440 and application servers 450, 452 may be called "productive nodes" because they receive and process service requests. As used herein, the term "node" refers to a data processing entity within instance 430 (e.g., dispatcher 440 and application servers 450, 452, 454, and 456). In one embodiment, "nodes" 440, 450, 452, 454, and 456 are J2EE application servers. Of course, nodes 440, 450, 452, 454, and 456 may be implemented in the context of various different software platforms including, by way of example, Microsoft .NET platforms and/or the Advanced Business Application Programming ("ABAP") platforms developed by SAP AG, the assignee of the present application.

In an embodiment of the invention, application servers 454 and 456 are used to debug an application that is provided by instance 430. Since application servers 454 and 456 provide a means to debug an application, they may be referred to as debug nodes 454 and 456, respectively. In an embodiment, debug node 454 includes debug port 455 and debug node 456 includes debug port 457. As is further described below, remote debugging client 410 may access debug nodes 454 and 456 via debug ports 455 and 457, respectively.

In an embodiment, debug nodes 454 and 456 are configured when instance 430 is started but are not necessarily activated by default. In such an embodiment, control logic 434 may include enable debug logic 436. Enable debug logic 436 may be used to activate debug nodes 454 and 456. In an embodiment, activating debug nodes 454 and 456 refers to switching the processes on so that they are executing.

In one embodiment, dispatcher 440 does not include debug nodes 454 and 456 in its load-balancing decisions. In an alternative embodiment, debug nodes 454 and 456 may process service requests until they are activated (e.g., switched to debug mode). In either case, in an embodiment of the invention, debug nodes 454 and 456 are isolated from dispatcher 440's load balancing mechanism once they are activated. In an embodiment, message server 404 instructs startup and control logic 432 to enable debug node 454 and/or debug node 456. Remotely debugging an application on instance 430 is described below with reference to FIG. 6.

Figure 5:
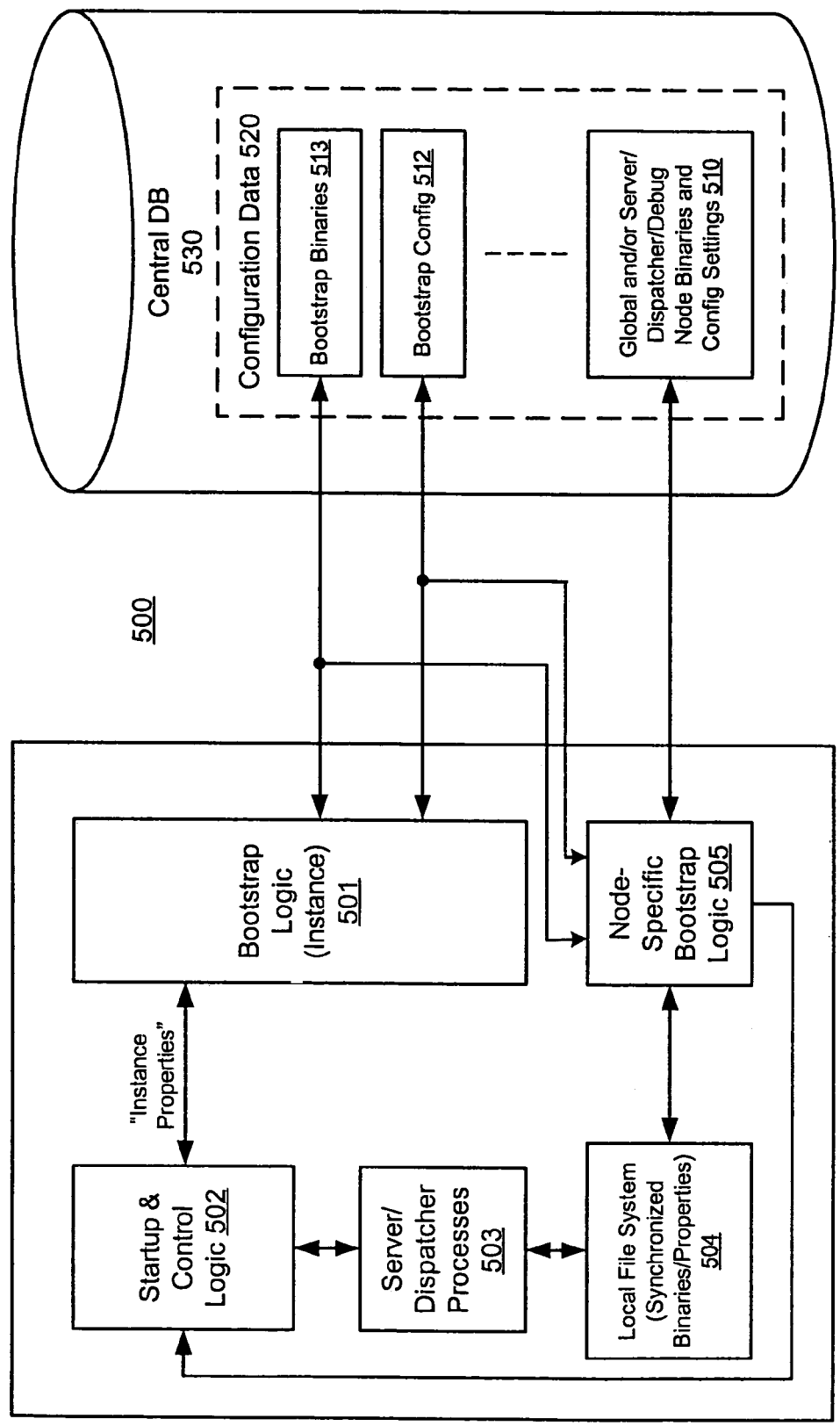
FIG. 5 illustrates an exemplary startup framework 500, suitable for use in an embodiment of the invention.

One embodiment of the invention employs a unique startup framework for starting and stopping the various server instances within the cluster. FIG. 5 illustrates an exemplary startup framework 500, suitable for use in an embodiment of the invention. The startup framework 500 includes startup and control logic 502 and bootstrap logic 501. In one embodiment, startup and control logic 502 provides the central point of control for an instance of application servers (e.g., instance 430, shown in FIG. 4) and for all processes 503 executed within the servers and dispatchers of the instance (e.g., instance 430, shown in FIG. 4). For example, the instance startup procedure described herein may be performed under the control of the startup and control logic 502.

In an embodiment the startup and control logic 502 launches the bootstrap logic 501 to initiate startup of the instance (e.g., in response to a startup command entered by a network administrator). As illustrated in FIG. 5, the bootstrap logic 501 is includes bootstrap binaries 513 stored within the central database 530 and the configuration of bootstrap logic 501 is defined by configuration parameters 512 stored within central database 530. Thus, if necessary, the bootstrap logic 501 may be modified/updated at central database 530 and subsequently distributed to servers/instances during the startup process.

In an embodiment, the bootstrap logic 501 retrieves up-to-date configuration data 520 from central database 530 including the layout of the instance (e.g., identifying the servers and dispatchers to be started and/or debug node(s) to be configured) and the parameters/arguments to be used for each server, dispatcher, and debug node within the instance (e.g., instance 430, shown in FIG. 4). In one embodiment, the bootstrap logic 501 uses this information to construct a description of the instance, which it provides to the startup and control logic 502 in the form of an "Instance Properties" data object. In one embodiment, the Instance Properties data object is a text file containing a list of servers, dispatchers, and debug node(s) as well as associated parameters which the startup and control logic 502 parses to determine the instance layout and instance settings. However, various alternate data formats may be employed for the Instance Properties file while still complying with the underlying principles of the invention (e.g., such as the "Extensible Markup Language" or "XML" format).

In an embodiment, the startup and control logic 502 builds a list of servers, and/or dispatchers to be started and debug node(s) to be configured using the instance layout and parameters/arguments from the Instance Properties data object, including, for example, configuration information for a debug port for each debug node. In one embodiment of the invention, prior to starting (or, in the case of a debug node, configuring) each server/dispatcher/debug node identified in the list, the startup and control logic 502 launches node-specific bootstrap logic 505 to synchronize the binaries and configuration settings on each server, dispatcher, and/or debug node. For example, depending on how long the instance (e.g., instance 430 shown in FIG. 4) was inoperative, the global and/or server/dispatcher/debug node-specific binaries and configuration settings 510 may have changed within the central database 530. Accordingly, in one embodiment, when the node-specific bootstrap logic 505 is launched, it compares the binaries and configuration settings stored in the local file system of the server/dispatcher being started (and/or debug node being configured) to the binaries and configuration settings 510 stored in the central database 530. In one embodiment, a comparison is performed between an index of the data stored locally on the server/dispatcher and an index of the data stored within the central database 520 to determine whether the configuration data at the server/dispatcher/debug node is out-of-date.

Regardless of how the comparison is performed, if the binaries and/or configuration settings stored within the local file system 504 of the dispatcher/server/debug node are out-of-date, then the current binaries and/or configuration settings 510 are retrieved from the central database 530 and stored within the local file system 504 of the dispatcher/server/debug node. In one embodiment, only the binaries and/or configuration settings which are new are copied to the local file system 504, thereby conserving network bandwidth and server resources.

Once synchronization is complete, the startup and control logic 502 executes the processes on each of the servers/debug nodes using arguments/parameters included within the Instance Properties data object. The startup and control logic 502 initializes the service framework and services on the servers/dispatchers within the instance (e.g., instance 430 shown in FIG. 4). In an embodiment, the service framework and services are the J2EE service framework and J2EE services, respectively. However, various other types of services/frameworks may be employed while still complying with the underlying principles of the invention. Once the framework and services are running, the application servers are available to process service requests.

Figure 6:
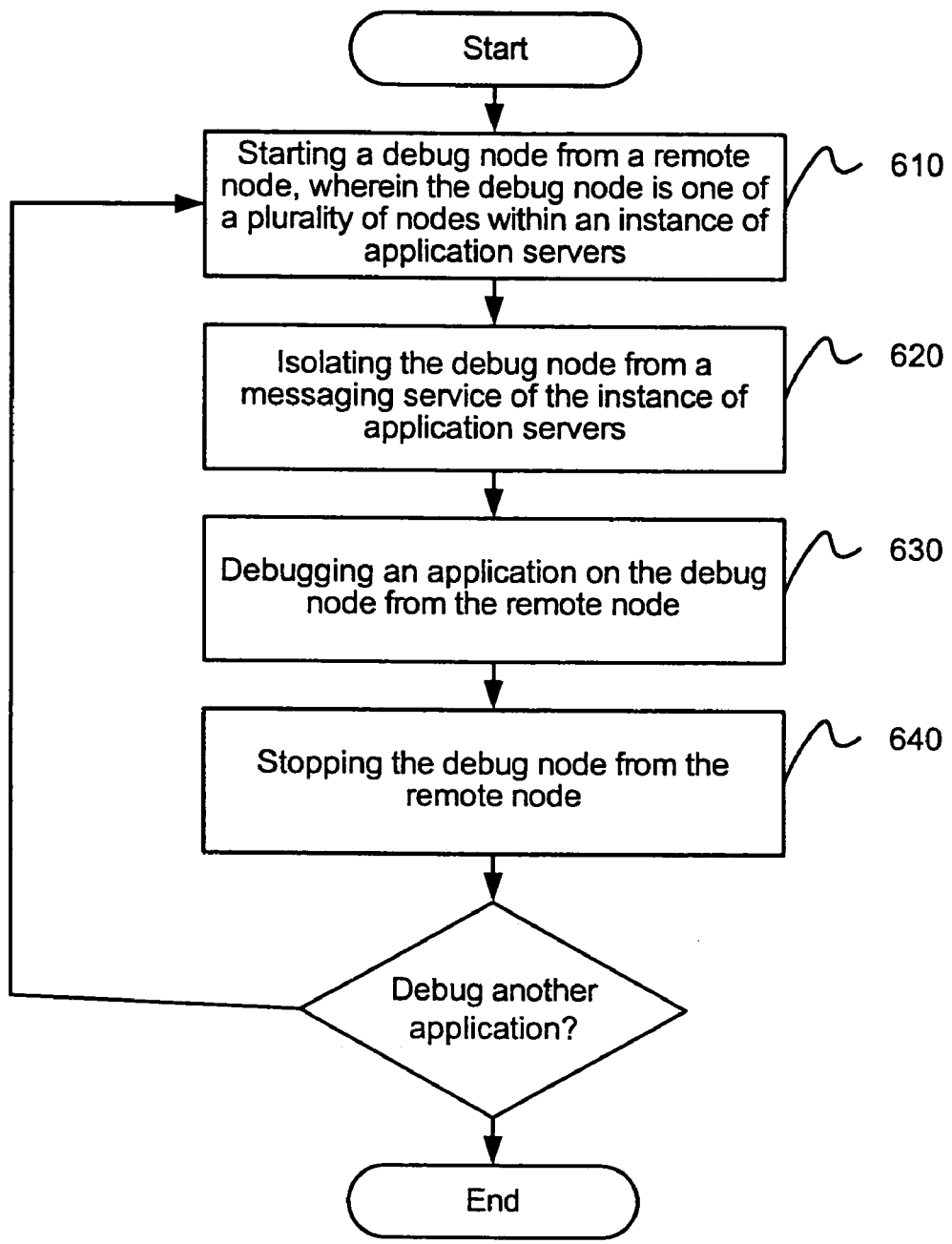
FIG. 6 is a flow diagram illustrating certain aspects of a method for remotely debugging an instance of application servers.

Turning now to FIG. 6, the particular methods associated with embodiments of the invention are described in terms of computer software and hardware with reference to a flowchart. The methods to be performed by a system for remote debugging may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of a method for remotely debugging an instance of application servers (e.g., instance 430 shown in FIG. 4). Referring to process block 610, a remote debugging client (e.g., remote debugging client 410 shown in FIG. 4) starts a debug node (e.g., debug node 454 shown in FIG. 4). The remote debugging client may send an "enable debugging" notification from an IDE (e.g., IDE 402 shown in FIG. 4) to a message server (e.g., message server 404 shown in FIG. 4). The message server may forward the enable debugging notification to the startup and control logic for the instance that includes the debug node (e.g., startup and control logic 432 shown in FIG. 4). In an embodiment, the startup and control logic may activate the debug node in response to the enable debugging notification.

In one embodiment, the debug node is, by default, not included in a load-balancing mechanism implemented within the instance. In an alternative embodiment, the debug node is a productive node until it is activated. In either case, starting the debug node includes isolating (or removing) the debug node from a load-balancing mechanism implemented within the instance, in an embodiment of the invention.

Referring to process block 620, the debug node is isolated, at least in part, from the instance's messaging service. In an embodiment, the remote debugging client (e.g., remote debugging client 410 shown in FIG. 4) notifies the message server (e.g., message server 404 shown in FIG. 4) that the debug node has been started. In response, the cluster repository logic within the message server (e.g., cluster repository logic 406 shown in FIG. 4), may remove the debug node from the message server's broadcast destination list (e.g., broadcast destination list 407 shown in FIG. 4). Once the debug node is removed from the broadcast destination list, it is isolated, at least in part, from the instance's messaging service.

In an embodiment, the message server notifies the debug node that it is isolated, at least in part, from the instance's messaging service. On receiving the notice, the debug node may change state from RUNNING to DEBUGGING. The other nodes within the instance (and/or cluster) may be notified that the debug node has changed state. In an embodiment, an IDE within the remote debugging client starts the debugging session and connects to the debug port (e.g., debug port 455) of the debug node. In an embodiment the debug port is a TCP port. A TCP port refers to a port that is implemented in accordance with (or partial accordance with) one of the TCP protocols. In one embodiment, the configuration of the debug port is provided to the remote debug client by the instance's startup and control logic during startup. In an alternative embodiment, the configuration of the debug port may be provided by a central database (e.g., central database 330, shown in FIG. 3).

Referring to process block 630, the remote node debugs an application on the debug node. In one embodiment, the application that is debugged is a Web-based application (or simply, a Web application). A "Web application" refers to an application that receives a service request via the Internet and/or provides processed information to a client through the Internet. In an embodiment, the remote node starts a Web browser and prepares a Uniform Resource Locator (URL) for the debug node. The prepared URL may include a request for debug notifications from the debug node. In an embodiment, the URL may include the cluster identifier of the debug node. The "cluster identifier" of the debug node refers to an identifier that uniquely identifies the debug node within a cluster (and/or instance). In an embodiment, the remote debugging client sends the URL/request to the instance that includes the debug node. A dispatcher within that instance may forward the URL/request to the debug node. After receiving the URL/request, the debug node may send one or more debug notifications to the remote debugging client. In an embodiment, the debug node sends the debug notifications from a debug port associated with (e.g., configured for) the debug node. In one embodiment, the "debug notifications" include, for example break points in the application logic to enable the remote debugging client to examine the behavior of the application logic. In an embodiment, the "debug notifications" may also include one or more fault codes that specify a fault that has occurred in the application logic. In an embodiment, the application logic is implemented in the Java programming language and is executed in a Java Virtual Machine of the debug node.

Referring to process block 640, the remote debugging client stops the debug node after it has debugged the application. In one embodiment, the remote debugging client ends the debugging session and sends a "disable debugging" notification to the message server. The message server may then forward the "disable debugging" notification to the startup and control logic in the instance that contains the debug node. In one embodiment, the startup and control logic deactivates the debug node without restarting it. In such an embodiment, the productive nodes within the instance (and/or cluster) may automatically receive an "element loss" notification from the message server.

In an embodiment, the startup and control logic configures a "debugging timeout" for each debug session. A "debugging timeout" refers to a maximum allowed length of time for a debug session. The "debugging timeout" provides a way to automatically limit the length of time that a debug node is out of synch with the productive nodes within an instance. In an embodiment, the startup and control logic automatically stops the debug node, once the "debugging timeout" has elapsed. In one embodiment the debugging timeout is approximately ten minutes in length.

Figure 7:
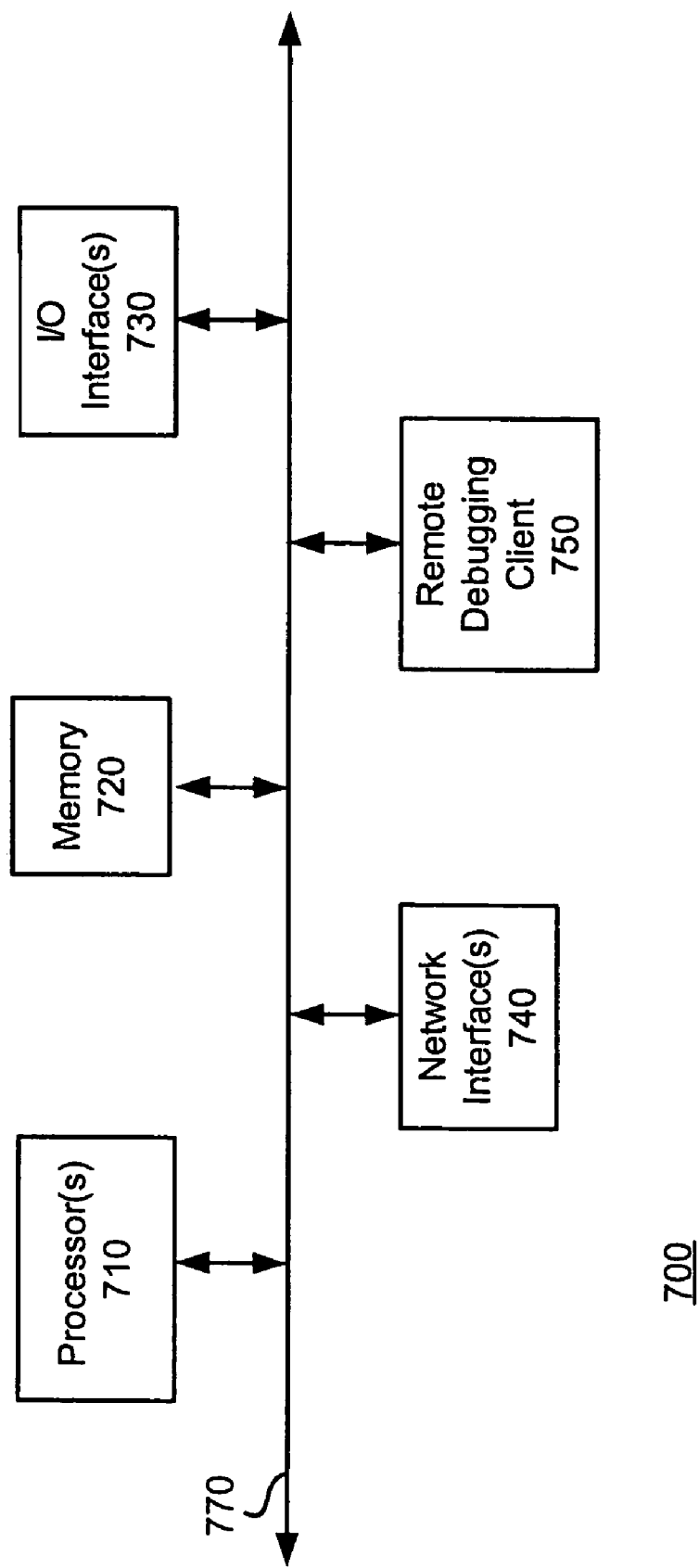
FIG. 7 is a block diagram of computing device 700 implemented according to an embodiment of the invention.

FIG. 7 is a block diagram of computing device 700 implemented according to an embodiment of the invention. Computing device 700 may include: one or more processors 710, memory 720, one or more Input/Output (I/O) interfaces 730, network interface(s) 740, and remote debugging client 750. The illustrated elements may be connected together through system interconnect 770. One or more processors 710 may include a microprocessor, microcontroller, field programmable gate array (FPGA), application specific integrated circuit (ASIC), central processing unit (CPU), programmable logic device (PLD), and similar devices that access instructions from system storage (e.g., memory 720), decode them, and execute those instructions by performing arithmetic and logical operations.

Remote debugging client 750 enables computing device 700 to provide remote debugging of an instance of application servers. Remote debugging client 750 may be executable content, control logic (e.g., ASIC, PLD, FPGA, etc.), firmware, or some combination thereof, in an embodiment of the invention. In embodiments of the invention in which remote debugging client 750 is executable content, it may be stored in memory 720 and executed by processor(s) 710.

Memory 720 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 720 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 720 may store program modules such as routines, programs, objects, images, data structures, program data, and other program modules that perform particular tasks or implement particular abstract data types that facilitate system use.

One or more I/O interfaces 730 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 770 permits communication between the various elements of computing device 700. System interconnect 770 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
    starting a debug node from a remote node, wherein the debug node is one of a plurality of nodes within an instance of appilcation servers;
    isolating the debug node from a messaging service of the instance of application servers comprising:
        removing the debug node from a broadcast destination list of the instance;
        instructing the debug node to transition to a debugging state; and
        accessing a debug port of the debug node to start a debugging session;
    isolating the debug node from a load-balancing mechanism of the instance of application servers:
    debugging an application on the debug node from the remote node; and
    stopping the debug node from the remote node.

2. The method of claim 1, wherein the accessed debug port is a Transmission Control Protocol (TCP) port of the debug node.

3. The method of claim 1, wherein debugging the application on the debug node from the remote node comprises debugging a Web application.

4. The method of claim 3, wherein debugging the Web application comprises;
    starting a Web browser on the remote node to interact with the Web application; and
    receiving a debug notification from the debug port of the debug node.

5. The method of claim 4, wherein stopping the debug node from the remote node comprises:

ending the debugging session; and
disabling the debug node from the remote node.

6. An apparatus comprising:
a development environment to debug a remote application: and
a processor and logic executable thereon to:
  start a debug node, wherein the debug node is one of a plurality of nodes within a remote instance of application servers;
  isolate the debug node from a messaging service of the instance of application servers by;
    removing the debug node from a broadcast destination list of the instance;
    instructing the debug node to transition to a debugging state; and
    accessing a debug port of the debug node to start a debugging session;
  isolate the debug node from a load-balancing mechanism of the instance of application servers;
  debug an application on the debug node; and
  stop the debug node.

7. The apparatus of claim 6, wherein the processor and logic executable thereon to debug the application on the debug node comprises a processor and logic executable thereon to debug a Java-based application executing on a Java virtual machine of the debug node.

8. The apparatus of claim 6 wherein the processor and logic executable thereon to stop the debug node comprises a processor and logic executable thereon to
  end a debugging session between the apparatus and the debug node; and
  disable the debug node.

9. A system comprising:
a means for starting a debug node from a remote node, wherein the debug node is one of a plurality of nodes within an instance of application servers;
a means for isolating the debug node from a load-balancing mechanism of the instance of application servers;
a means for isolating the debug node from a messaging service of the instance of application servers comprising:
a means for removing the debug node from a broadcast destination list of the instance;
a means for instructing the debug node to transition to a debugging state; and
  a means for accessing a debug port of the debug node to start a debugging session;
a means for debugging an application on the debug node from the remote node; and
a means for stopping the debug node from the remote node.

10. The system of claim 9, wherein the means for debugging the application on the debug node from the remote node comprises:
  a means for debugging a Web application on the debug node.

11. The system of claim 10, wherein the means for debugging the Web application comprises:
  a means for starting a Web browser on the remote node to interact with the Web application; and
  a means for receiving a debug notification from the debug port of the debug node.

12. An article of manufacture comprising:
a computer-readable medium providing instructions that, when executed by an apparatus, cause the apparatus to
  start a debug node from a remote node, wherein the debug node is one of a plurality of nodes within an instance of application servers;
  isolate the debug node from a load-balancing mechanism of the instance of application servers;
  isolate the debug node from a messaging service of the instance of application servers, which further cause the apparatus to
    remove the debug node from a broadcast destination list of the instance;
    instruct the debug node to transition to a debugging state;
    access a debug port of the debug node to start a debugging session;
  debug an application on the debug node from the remote node; and
  stop the debug node from the remote node.

13. The article of manufacture of claim 12, wherein the instructions that, when executed by the apparatus, cause the apparatus to debug the application on the debug node from the remote node cause the apparatus to
  debug a Web application on the debug node.

14. The article of manufacture of claim 13, wherein the instructions that, when executed by the apparatus, cause the apparatus to debug the Web application on the debug node cause the apparatus to
  start a Web browser on the remote node to interact with the Web application; and
  receive a debug notification from the debug port of the debug node.

15. The article of manufacture of claim 12, wherein the instructions that, when executed by the apparatus, cause the apparatus to stop the debug node from the remote node cause the apparatus to
  end the debugging session; and
  disable the debug node from the remote node.

* * * * *